United States Patent
Zhang et al.

(10) Patent No.: US 10,372,073 B2
(45) Date of Patent: Aug. 6, 2019

(54) REPAIR METHOD AND REPAIR CHIP FOR REGENERATIVE INK CARTRIDGE, AND REGENERATIVE INK CARTRIDGE

(71) Applicant: HANGZHOU CHIPJET TECHNOLOGY CO., LTD., Hangzhou, Zhejiang (CN)

(72) Inventors: Heng Zhang, Zhejiang (CN); Ming Kong, Zhejiang (CN); Xinping Peng, Zhejiang (CN)

(73) Assignee: HANGZHOU CHIPJET TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/749,117

(22) PCT Filed: Dec. 22, 2015

(86) PCT No.: PCT/CN2015/098212
§ 371 (c)(1),
(2) Date: Jan. 30, 2018

(87) PCT Pub. No.: WO2017/107045
PCT Pub. Date: Jun. 29, 2017

(65) Prior Publication Data
US 2018/0224787 A1    Aug. 9, 2018

(51) Int. Cl.
*B41J 2/175* (2006.01)
*G03G 15/00* (2006.01)
*G03G 15/08* (2006.01)
*G03G 21/18* (2006.01)
*G06F 13/00* (2006.01)

(52) U.S. Cl.
CPC ........ *G03G 15/553* (2013.01); *B41J 2/17503* (2013.01); *B41J 2/17546* (2013.01); *B41J 2/17559* (2013.01); *G03G 21/1875* (2013.01); *G03G 21/1878* (2013.01); *G03G 21/1882* (2013.01); *G06F 13/00* (2013.01); *G03G 15/0894* (2013.01); *G03G 2215/00987* (2013.01)

(58) Field of Classification Search
CPC .............. G03G 15/553; G03G 21/1878; B41J 2/17503; B41J 2/17546
See application file for complete search history.

(56) References Cited

FOREIGN PATENT DOCUMENTS

| CN | 104070824 A | 10/2014 |
| CN | 204472118 U | 7/2015 |
| CN | 104070824 B | * 4/2016 |

OTHER PUBLICATIONS

International Search Report of PCT Patent Application No. PCT/CN2015/098212 dated Sep. 30, 2016.

* cited by examiner

*Primary Examiner* — Bradley W Thies

(57) ABSTRACT

The application relates to the field of print imaging, in particular to a repair method and repair chip for a regenerative ink cartridge, and a regenerative ink cartridge. The repair chip does not need to monitor all lines of a printer and only needs to monitor an enable line, a data line and 0~n−1 auxiliary lines of the printer, so that the number of pads, electrically connected with the printer, of an original chip is reduced, the welding difficulty and workload in the ink cartridge regeneration process are lowered accordingly, and the risk of ink cartridge scraping in the repair process is lowered from the source.

10 Claims, 13 Drawing Sheets

REPAIR METHOD AND REPAIR CHIP FOR REGENERATIVE INK CARTRIDGE, AND REGENERATIVE INK CARTRIDGE

FIELD OF TECHNOLOGY

The application relates to the field of print imaging, in particular to a repair method and repair chip for a regenerative ink cartridge, and a regenerative ink cartridge.

BACKGROUND ART

An existing ink cartridge chip of a printer comprises enable pads, data pads, address pads and clock pads which communicate with an enable line, a data line, an address line and a clock line of the printer respectively, receive a command from the printer and give response, and relevant using and configuration information is stored in the ink cartridge chip. For preventing users from using ink cartridges running out of ink repeatedly, the method that the using information of ink cartridges cannot be directly restored is adopted by original ink cartridge manufacturers, for example, a fuse wire (one-time programmable memory) is adopted by a storage unit for recording ink quantity information. When ink in the ink cartridge is used up, the memory unit on the ink cartridge can record the state information indicating that the ink is used up, and consequentially the ink cartridge cannot be used any more.

Repair chips are developed by certain ink cartridge manufacturers, and the repair chips work with original chips of the ink cartridges to restore the ink cartridges, so that when printers obtain the ink residue information of the ink cartridges, the ink cartridges can feed back information reflecting that ink in the ink cartridges is not used up. An existing repair chip is generally provided with enable pads, data pads, address pads and clock pads, and the numbers of pads of the existing repair chip are the same as those of pads of an original chip of the ink cartridge. As is shown in FIG. 1, the pads of the repair chip are electrically connected with the corresponding pads of the original chip respectively and also electrically connected with an enable line, a data line, an address line and a clock line of a printer. The repair chip receives operating signals from the printer according to a communication protocol between the printer and the original chip of the ink cartridge and modifies returned data of the original chip when a data reading command is sent by the printer, so that the printer is informed of the information indicating that ink in the ink cartridge is not used up, and the ink cartridge can continue to be used accordingly. When the repair method is used for repairing the ink cartridge, all the pads of the original chip need to be electrically connected with the repair chip, and since the original chip and the repair chip are extremely small in size, contact areas are extremely small, and the problems of insufficient welding, welding omission, short circuits and the like can be caused easily in the welding process. On the one hand, the requirement for the welding technique in the repairing process is high, and on the other hand, all the pads of the original chip and the repair chip have to be checked one by one after welding is completed. Therefore, the more the pads needing to be connected between the original chip and the repair chip are, the larger the number of pads needing to be welded on an extremely-small circuit board is, and the higher the welding difficulty is; the more the pads needing to be connected between the original chip and the repair chip are, the higher the welding difficulty is, and the larger the number of scrapped ink cartridges caused by poor welding is; the more the pads needing to be connected between the original chip and the repair chip are, the larger the number of pads needing to be checked in the later stage is, and the larger the workload of ink cartridge regeneration is.

A repair chip, an ink cartridge and a printer are disclosed in the Chinese patent with the application number of 201520073875.4; the repair chip comprises a substrate, hollowed-out parts, memory unit pads and signal accessible pads, wherein the substrate is provided with a front side and a back side; the hollowed-out parts are arranged on the substrate and correspond to nozzle control pads of a flexible circuit board (namely an original chip of the ink cartridge) of the ink cartridge in position; the memory unit pads are arranged on the front side of the substrate and electrically connected with a memory unit of the repair chip; the signal accessible pads are arranged on the front side and the back side of the substrate, and the signal accessible signal pads, at corresponding positions, on the front side and the back side are connected for communication. By mounting the repair chip of the utility model on the flexible circuit board of the ink cartridge, the accuracy of the mounting position of the repair chip can be ensured, the risk of short circuits caused when the repair chip is electrically connected to the flexible circuit board of the ink cartridge is lowered to a certain extent, and the rate of finished regenerative ink cartridges is increased. However, under the condition that the number of pads needing to be welded is still large, scrapping of a large number of products can still be caused by short circuits.

SUMMARY OF THE INVENTION

For solving the technical problem that in the prior art, welding is needed in the repairing process of regenerative ink cartridges, and consequentially pads are caused, the application provides a repair method for a regenerative ink cartridge; the repair method for the regenerative ink cartridge is suitable for a repair chip storing repair data and wherein the repair chip returns all or part of the repair data to a printer through a data line of the printer according to signals on 0~n-1 auxiliary lines of the printer and on an enable line of the printer; Wherein, the auxiliary lines include address lines and a clock line of the printer; the repair data are data used for making information indicating the ink cartridge residual ink quantity of an ink cartridge not be 0; n equals to the sum of the number of the address lines of the printer and the number of the clock line of the printer. The repair chip does not need to monitor all lines of the printer and only needs to monitor the enable line, the data line and the 0~n-1 auxiliary lines of the printer, so that the number of pads, electrically connected with the printer, of an original chip is reduced, the welding difficulty and workload in the ink cartridge regeneration process are lowered accordingly, and the risk of scrapping of ink cartridges in the repair process is lowered from the source. The repair chip judges the type of a command sent by the printer according to the characteristics of signals on only a few of printer lines monitored by the repair chip, by the characteristic of a communication protocol between an original chip of the ink cartridge and the printer; and when it is judged that the command sent by the printer is a valid data reading command, the repair chip determines data needing to be required by the printer, according to the signals on the a few of printer lines monitored by the repair chip, and returns data to the printer through the data line of the printer.

The repair chip judges the command of the printer through the two following methods: Firstly, the repair chip judges whether the command sent by the printer is a valid data reading command or not according to signals on the 1~m−1 address lines and on the enable line of the printer and returns all or part of the repair data to the printer through the data line of the printer when the command sent by the printer is a valid data reading command. Wherein, m equals to the number of the address lines of the printer.

Preferably, when valid signals appear on the enable line of the printer, it is judged that the command sent by the printer is a valid data reading command if the signals exist on at most one of the 1~m−1 address lines of the printer; otherwise, it is judged that the command sent by the printer is not a valid data reading command.

Secondly, the repair chip judges whether the command sent by the printer is a valid data reading command or not according to the time interval between a valid signal appearing on the enable line of the printer and a clock signal of the printer or the time interval between valid signals appearing on the enable line of the printer and returns all or part of the repair data to the printer through the data line of the printer when the command sent by the printer is a valid data reading command.

Preferably, the method for judging whether the command sent by the printer is a valid data reading command or not comprises the steps of comparing the time interval with a preset minimum time interval value and a preset maximum time interval value, judging that the command sent by the printer is not a valid data reading command if the time interval is greater than the preset maximum time interval value or the time interval is smaller than the preset minimum time interval value, and judging that the command sent by the printer is a valid data reading command if the time interval is greater than the preset minimum time interval value and smaller than the preset maximum time interval value.

Preferably, when a valid signal appears on the enable line of the printer, whether the valid signal is an initial valid enable signal or not is judged. If the valid signal is an initial valid enable signal, all or part of the repair data are returned to the printer through the data line of the printer; if the valid enable signal is not an initial valid enable signal, all or part of the repair data are returned to the printer through the data line of the printer when command sent by the printer is a valid data reading command;

Preferably, the repair chip judges whether the valid enable signal appearing on the enable line of the printer is an initial valid enable signal or not according to an initial enable signal sign, and the value of the initial enable signal sign is set as a value indicating that the valid enable signal appearing on the enable line of the printer is not an initial valid enable signal after the valid enabling is achieved on the enable line of the printer;

Whether the command sent by the printer is a valid data reading command or not is judged according to the time interval between the enable signals appearing on the enable line of the printer. When a valid enable signal appears on the enable line of the printer, it is judged that the valid enable signal is an initial valid enable signal if the initial enable signal sign is true, otherwise, it is judged that the valid enable signal is not an initial valid enable signal. When the valid enable signal is an initial valid enable signal, all or part of the repair data are returned to the printer through the data line of the printer, and the initial valid enable signal is set to be false. If the valid enable signal is not an initial valid enable signal, all or part of the repair data are returned to the printer through the data line of the printer when whether the command of the printer is a valid data reading command or not is judged, when it is judged that the command of the printer is not a valid data reading command, the initial enable signal is set to be true, and the data index values are set as the initial value. Wherein, the data index values are in one-to-one correspondence with the addresses of the repair data, needing to be returned, in the repair chip; the initial enable signal sign is used for marking whether the received valid enable signal is an initial valid enable signal or not.

The repair chip can determine data needing to be acquired by the printer through the following methods:

Firstly, the repair chip determines repair data needing to be returned to the printer according to signals on the m−1 address lines of the printer and on the enable line of the printer; the address block where the repair data needing to be returned are located is judged according to signals on the m−1 address line of the printer when a valid enable signal appears on the enable line of the printer. The repair data needing to be returned are found out in the address block according to data index values, and the repair data needing to be returned are returned to the printer through the data line of the printer. The data index values are compared with the maximum data index value of the address block, 1 is added to the data index values if the data index values are smaller than the maximum data index value of the address block, and the data index values are set to an initial value if the data index values are greater than or equal to the maximum data index value of the address block. Wherein, the data index values are in one-to-one correspondence with the addresses, in the address block, of the repair data in the address block; m equals to the number of the address lines of the printer.

Preferably, the method for judging the address block where the repair data needing to be returned are located according to the signals on the m−1 address lines of the printer when a valid enable signal appears on the enable line of the printer comprises the steps that according to the one-to-one corresponding relation between address blocks stored in the repair chip and the address lines of the printer, when the valid enable signal appears on the enable line of the printer, the address block where the repair data needing to be returned are located is the address block corresponding to the address line not monitored by the repair chip if no signal exists on the m−1 address lines of the printer, and the address block where the repair data needing to be returned are located is the address block corresponding to the address line with the signal if the signal exists only on one of the m−1 address lines of the printer.

Secondly, the repair chip returns all or part of the repair data to the printer through the data line of the printer in a preset sequence.

The application further provides a repair chip for a regenerative ink cartridge. The repair chip for the regenerative ink cartridge comprises a storage device used for storing repair data and is characterized by further comprising 0~n−1 auxiliary pads electrically connected with 0~n−1 auxiliary lines of the printer and used for monitoring the auxiliary lines of the printer, enable pads electrically connected with the enable line of the printer and used for monitoring the enable line of the printer, and a data returning device used for returning all or part of the repair data to the printer through data pads according to signals, monitored by address pads and the enable pads, on the 0~n−1 auxiliary lines of the printer. Wherein, the auxiliary lines include address lines and a clock line of the printer; the auxiliary pads include address pads used for monitoring the address lines of the printer and clock pads used for monitoring the clock line of the printer; the repair data are data making information indicating the ink cartridge residual ink quantity of the ink cartridge not be 0; n equals to the sum of the number of the address lines of the printer and the number of the clock line of the printer.

Preferably, the repair chip comprises a command judgment device used for judging whether the command sent by the printer is a valid data reading command or not according to signals monitored by the 1~m−1 address pads and the enable pads, and the data returning device returns all or part of the repair data to the printer through the data pads when it is judged that the command sent by the printer is a valid data reading command according to the judgment result of the command judgment device. Wherein, m equals to the number of the address lines of the printer.

Preferably, the repair chip comprises a timer and a command judgment device, wherein the timer is used for calculating the time interval between a valid enable signal, monitored by the enable pads, appearing on the printer and a clock signal, monitored by the clock pads, of the printer or calculating the time interval between valid enable signals, monitored by the enable pads, appearing on the printer; the command judgment device is used for judging whether the command sent by the printer is a valid data reading command or not according to the time interval. The data sending device is used for returning all or part of the repair data to the printer through the data pads when it is judged that the command sent by the printer is a valid data reading command according to the judgment result of the command judgment device.

Preferably, the command judgment device comprises a command judgment unit. The command judgment unit judges that the command sent by the printer is a valid data reading command when signals are monitored on only one of the 1~m−1 address pads at most, otherwise, the command judgment unit judges that the command sent by the printer is not a valid data reading command.

Preferably, the command judgment device comprises a comparator, wherein the comparator is used for comparing the time interval with a preset minimum time interval value and comparing the time interval with a preset maximum time interval value. The command judgment device judges that the command sent by the printer is not a valid data reading command when the time interval is greater than the preset maximum time interval value or the time interval is smaller than the preset minimum time interval value; the command judgment device judges that the command sent by the printer is a valid data reading command when the time interval is greater than the preset minimum time interval value and smaller than the preset minimum time interval value.

Preferably, the repair chip further comprises an initial valid enable signal judgment device, wherein the initial valid enable signal judgment device judges whether a valid enable signal is an initial valid enable signal or not when the enable pads monitor that the valid enable signal appears on the enable line of the printer; the data returning device returns all or part of the repair data to the printer through the data pads when the enable pads monitor the initial valid enable signal according to the judgment result of the initial valid enable signal judgment device. The command judgment device judges whether the command of the printer is a valid data reading command or not when the enable pads monitor a non-initial valid enable signal according to the judgment result of the initial valid enable signal judgment device; the data returning device returns all or part of the repair data to the printer through the data pads according to the judgment result of the command judgment device when the command judgment device judges that the command sent by the printer is a valid data reading command. The storage device stores an initial enable signal sign and data index values, and when the command judgment device judges that the command of the printer is not a valid data reading command, the initial valid enable signal is set to be true, and the data index values are set as the initial value. Wherein, the data index values are in one-to-one correspondence with the addresses of the repair data, needing to be returned, in the repair chip; the initial enable signal sign is used for marking whether the received valid enable signal is an initial valid enable signal or not.

Preferably, the storage device stores an initial enable signal sign used for indicating whether a valid enable signal monitored by the enable pads is an initial valid enable signal or not; the value of the initial enable signal sign is set as a value indicating that the valid enable signal monitored by the enable pads is a non-initial valid enable signal after the enable pads monitor the valid enable signal.

Preferably, the data returning device comprises an address judgment device, a data sending device, a comparator and a counter, wherein the address judgment device is used for judging the address block where the repair data needing to be returned are located according to signals monitored by the m−1 address pads; the data sending device is used for finding out the repair data needing to be returned in the address block according to data index values and returning the repair data needing to be returned to the printer through the data line of the printer; the comparator is used for comparing the data index values with the maximum data index value of the address block; 1 is added to the data index values if the data index values are smaller than the maximum data index value of the address block, and the data index values are set as the initial value if the data index values are greater than or equal to the maximum data index value of the address block. Wherein, the data index values are in one-to-one correspondence with the addresses, in the address block, of the repair data in the address block; m equals to the number of the address lines of the printer.

Preferably, the address judgment device comprises an address block memory used for storing the one-to-one corresponding relation between the address lines of the printer and address blocks. If the address pads do not monitor signals on any of the m−1 address lines of the printer, the address judgment device judges that the address block where the repair data needing to be returned are located is the address block, corresponding to the address line not monitored by the repair chip, in the address block memory; if the address pads monitor that the signal only exists on one of the m−1 address lines of the printer, the address judgment device judges that the address block where the repair data needing to be returned are located is the address block, corresponding to the address line with the signal, in the address block memory.

Preferably, the data returning device returns all or part of the repair data to the printer through the data line of the printer in a preset sequence.

The application further provides a regenerative ink cartridge. The regenerative ink cartridge comprises an ink cartridge body and an original chip mounted on the ink cartridge body and is characterized in that the regenerative ink cartridge further comprises the repair chip, the enable pads of the repair chips are electrically connected with enable pads of the original chip, and the data pads of the repair chip are electrically connected with data pads of the original chip.

Preferably, the address pads of the repair chip are electrically connected with address pads of the original chip.

Preferably, the address pads of the repair chip are electrically connected with address pads of the original chip.

The application has the following beneficial effects that:
1. By reducing the number of electrically-connected pads between the repair chip and the original chip as well as between the repair chip and the printer, the welding technological difficulty in the reproduction process of ink cartridges is lowered.
2. By reducing the number of the electrically-connected pads between the repair chip and the original chip as well as between the repair chip and the printer, the contact checking workload in the reproduction process of ink cartridges is reduced.
3. By reducing the number of the electrically-connected pads between the repair chip and the original chip as well as between the repair chip and the printer, the rejection rate of ink cartridges in the reproduction process of ink cartridges is decreased directly.
4. By lowering the welding technological difficulty and reducing the contact checking workload in the reproduction process of ink cartridges, production efficiency is improved, and production cost is reduced.
5. By decreasing the rejection rate of ink cartridges in the preproduction process of ink cartridges, the utilization rate of discarded ink cartridges is increased, waste of ink cartridges is reduced, and energy-saving and environment-protecting effects are better.

DETAILED DESCRIPTION OF THE INVENTION

Figure 1:
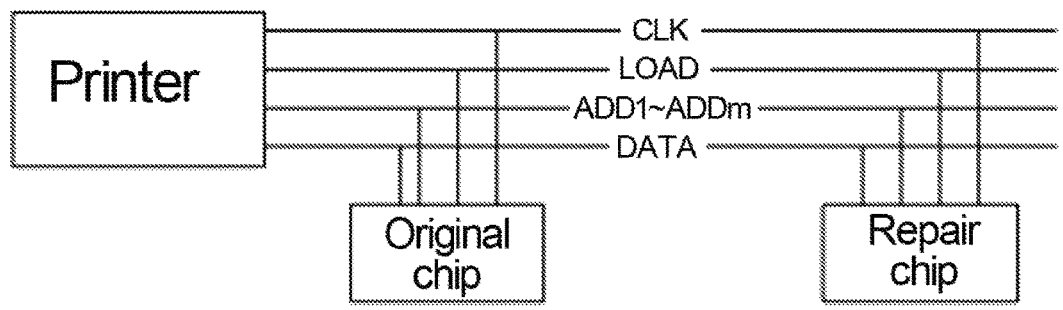
FIG. 1 is a schematic diagram of electrical connection between a repair chip, an original chip and a printer in the prior art.
Figure 2:
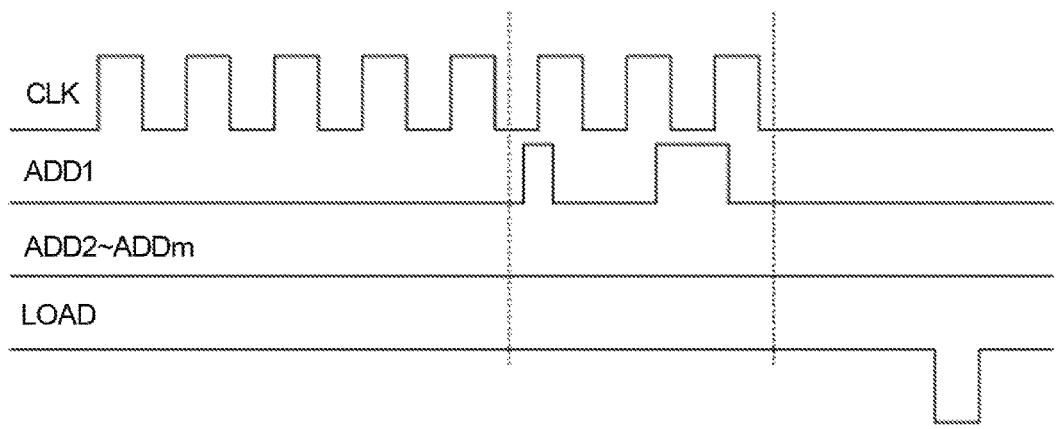
FIG. 2 is a sequence diagram of a valid data reading command sent by a printer.

A detailed description of the embodiments of the application is given as follows with accompanying drawings. An original chip of an ink cartridge is provided with enable pads, data pads, address pads and clock pads which are electrically connected with an enable line, a data lines, address lines and a clock line of a printer respectively. The ink cartridge is mounted on the printer. The clock pads of the original chip of the ink cartridge are electrically connected with the clock line of the printer, the enable pads of the original chip are electrically connected with the enable line of the printer, the data pads of the original chip are electrically connected with the data line of the printer, and the m address pads of the original chip are electrically and respectively connected with the m address lines of the printer in a one-to-one corresponding mode. As is shown in FIG. 1, a serial communication mode is adopted for data communication between the ink cartridge and the printer, the clock line CLK, the enable line LOAD and the data line DATA are shared, and the address lines ADD1-ADDm are used separately. Each address line corresponds to one address block of the original chip. A crystal oscillator is arranged in the original chip of the ink cartridge, and thus the address lines are sampled on the rising edge and the falling edge of a clock respectively with a clock signal sent by the external printer being used as the sampling clock. FIG. 2 shows a valid data reading command sent by the printer, only one address line (ADD1) has high-low level changes, and the other address lines (ADD2-ADDm) are kept at low levels. At the moment, it is defaulted that the address block corresponding to the address ADD1 is selected by the printer, and a repair chip samples and decodes signals appearing on the address line ADD1. When a valid enable signal appears on the enable line, data corresponding to an address value, obtained through sampling and decoding, in the address block corresponding to the address line ADD1 are returned to the printer through the data line DATA.

Therefore, when a valid data reading command is sent by the printer, the signal line CLK, the address lines ADD1-m and the enable line LOAD are combined. Whether the command sent by the printer is a valid data reading command or not is judged accurately according to the related characteristics between certain signal lines of the printer in the communication process, a memory address for current operation is confirmed automatically, and corresponding repair data are extracted from the corresponding memory address and returned to the printer through the data line of the printer.

First Embodiment

Figure 3:
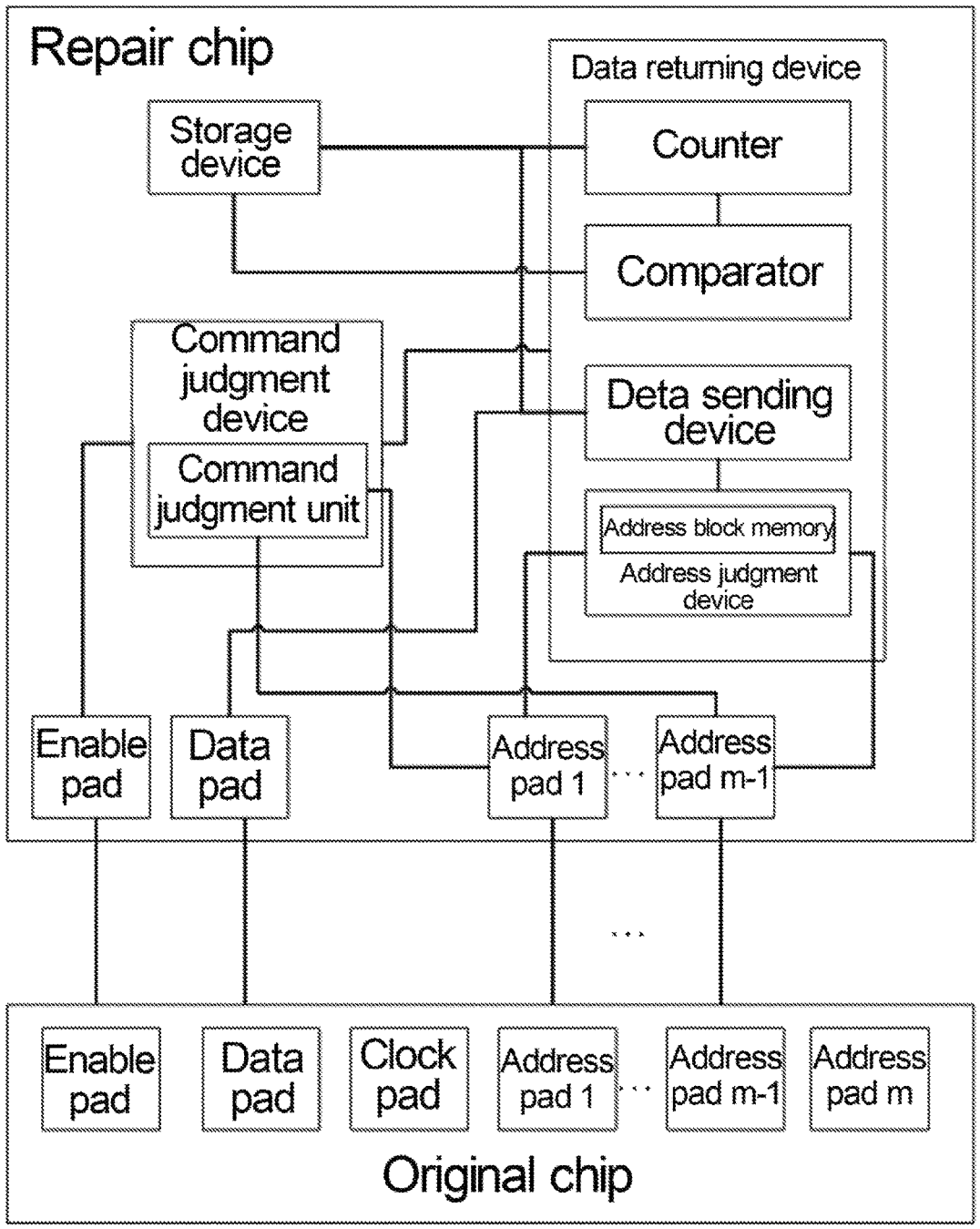
FIG. 3 is a system diagram of an ink cartridge in a first embodiment.

In the embodiment, the clock line CLK and any one of the address lines ADD can be omitted. A repair chip is provided with enable pads, data pads and address pads, and the number of the address pads is one smaller than the number of the address lines of the printer; suppose that the number of the address lines of the printer is m, the number of address pads of an original chip is m, and the number of the address pads of the repair chip is m−1. As is shown in FIG. 3, the repair chip is provided with a storage device, a command judgment device and a data returning device, wherein repair data are stored in the storage device, and the data returning device is electrically connected with the address pads, the data pads and the enable pads respectively and also electrically connected with the command judgment device. The command judgment device is provided with a command judgment unit, and the command judgment unit is electrically connected with the m−1 address pads and judges the type of the command of the printer according to signals, monitored by the address pads, on the address lines of the printer when the enable pads monitor a valid enable signal on the trigger enable line of the printer. The data returning device is electrically connected with the command judgment device and also electrically connected with the storage device. The data returning device comprises an address judgment device, a data sending device, a comparator and a counter. The address judgment device comprises an address block memory used for storing the one-to-one corresponding relation between the address lines of the printer and address blocks.

A discarded ink cartridge needing to be regenerated comprises an ink cartridge body and an original chip mounted on the ink cartridge body, the repair chip is mounted on the ink cartridge body, and the enable pads of the repair chip are electrically connected with enable pads of the original chip; the data pads of the repair chip are electrically connected with data pads of the original chip; the address pads of the repair chip are electrically connected with any m−1 address pads of m address pads of the original chip.

Figure 4:
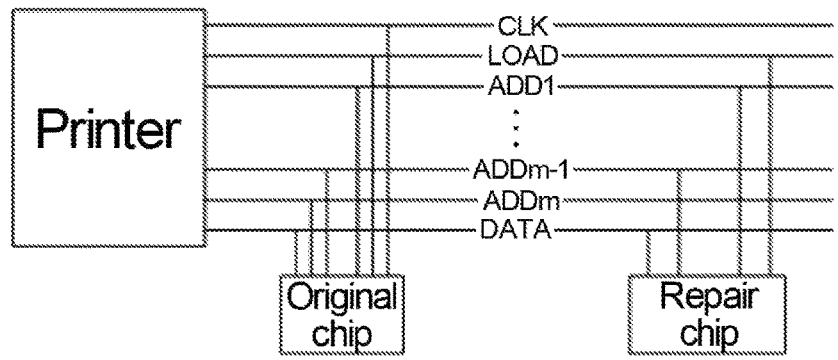
FIG. 4 is a schematic diagram of electrical connection of a repair chip, an original chip and a printer in the first embodiment.

As is shown in FIG. 4, a regenerative ink cartridge provided with the repair chip is mounted on the printer, and the enable pads of the repair chip are electrically connected with the enable line of the printer so as to monitor signals on the enable line of the printer; the data pads of the repair chip are electrically connected with the data line of the printer so as to transmit data to the printer through the data line; the m−1 address pads of the repair chip are electrically connected with the m−1 address lines of the printer so as to monitor signals on the m−1 address lines of the printer.

Repair data used for making information indicating the ink cartridge residual ink quantity of the ink cartridge not be 0 are stored in the storage device of the repair chip. The repair data are stored in m address blocks which are in one-to-one correspondence with the address lines of the printer. A certain quantity of repair data exist in each address block, and the maximum data index value IDmax is set for each address block and indicates the quantity of repair data stored in the address block.

The repair chip monitors the enable line and the address lines of the printer through the enable pads and the address pads, whether the command sent by the printer is a valid data reading command or not is judged through the command judgment device, and when the command judgment device judges that the command sent by the printer is a valid data reading command, the data sending device of the repair chip finds out the address block where the repair data needing to be returned are located through the address judgment device, finds out the storage address of the repair data in the address block according to data index values and sends the repair data to the printer; in this way, the information, indicating the ink cartridge residual ink quantity of the ink cartridge, obtained by the printer is not 0, and the ink cartridge can continue to be used.

Figure 5:
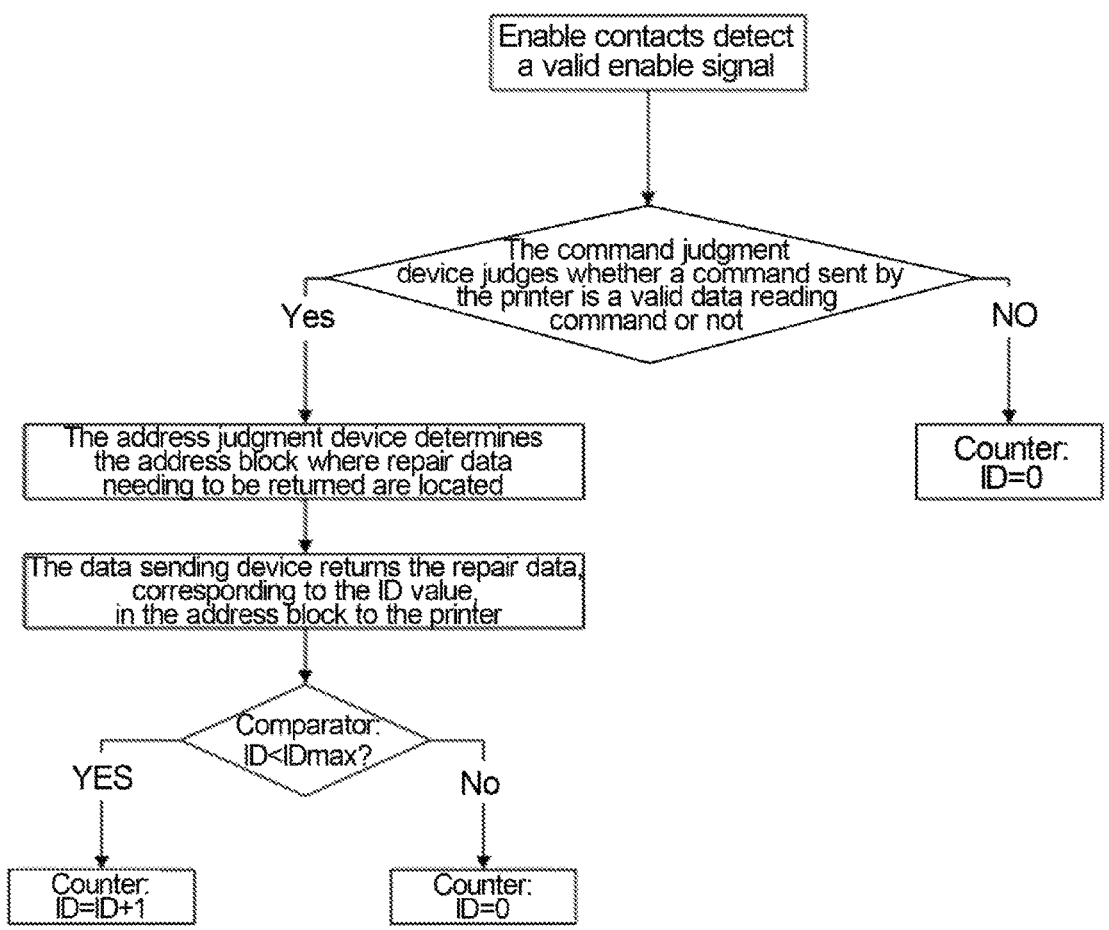
FIG. 5 is a flow diagram of the repair chip in the first embodiment.

FIG. 5 shows the specific working flow of the repair chip:

the enable pads monitor signals on the enable line of the printer, and the command judgment device of the repair chip is electrically connected with the enable pads and starts the command judgment unit to judge the type of the command of the printer when the enable pads monitor a valid enable signal.

Figure 6:
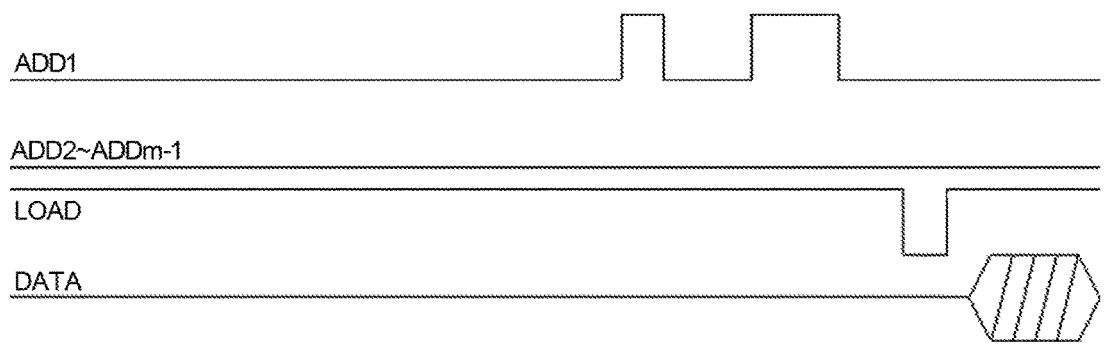
FIG. 6 is a schematic diagram of printer command judgment in the first embodiment.

FIG. 6 shows the method for the command judgment unit to judge the type of the command of the printer: if only one of the m−1 address pads monitors signals on the corresponding address line at most, it is judged that the command sent by the printer is a valid data reading command, otherwise, it is judged that the command sent by the printer is not a valid data reading command.

The data returning device is electrically connected with the command judgment unit and also electrically connected with the address judgment device, and the address judgment device determines the address block where the repair data needing to be returned are located when the command judgment unit judges that the command sent by the printer is a valid data reading command;

the one-to-one corresponding relation between the address lines of the printer and the address blocks is stored in an address block memory; if the address pads do not monitor signals on any of the m−1 address lines of the printer, the address judgment devices judges that the address block where the repair data needing to be returned are located is the address block corresponding to the address line, not monitored by the repair chip, in the address block memory; if the address pads monitor that the signal only exists on one of the m−1 address lines of the printer, the address judgment device judges that the address block where the repair data needing to be returned are located is the address block, corresponding to the address line with the signal, in the address block memory.

The data sending unit searches the corresponding address block for the repair data stored in the address corresponding to the ID value (the data index value), and the repair data are sent out through the data pads and transmitted to the printer through the data line of the printer. In this way, the information, indicating the ink cartridge residual ink quantity of the ink cartridge, obtained by the printer is not 0, namely the printer is informed of the information that ink in the ink cartridge is not used up.

Afterwards, the comparator compares the ID value (the data index value) with the IDmax value (the maximum data index value) of the corresponding address block;

if ID<IDmax, 1 is added to the ID value through the counter;

if ID>=IDmax, the ID value is set as the initial value 0 through the counter;

In addition, if the command judgment device judges that the command sent by the printer is not a valid data reading command, the counter sets the ID value as the initial value 0.

Second Embodiment

Figure 7:
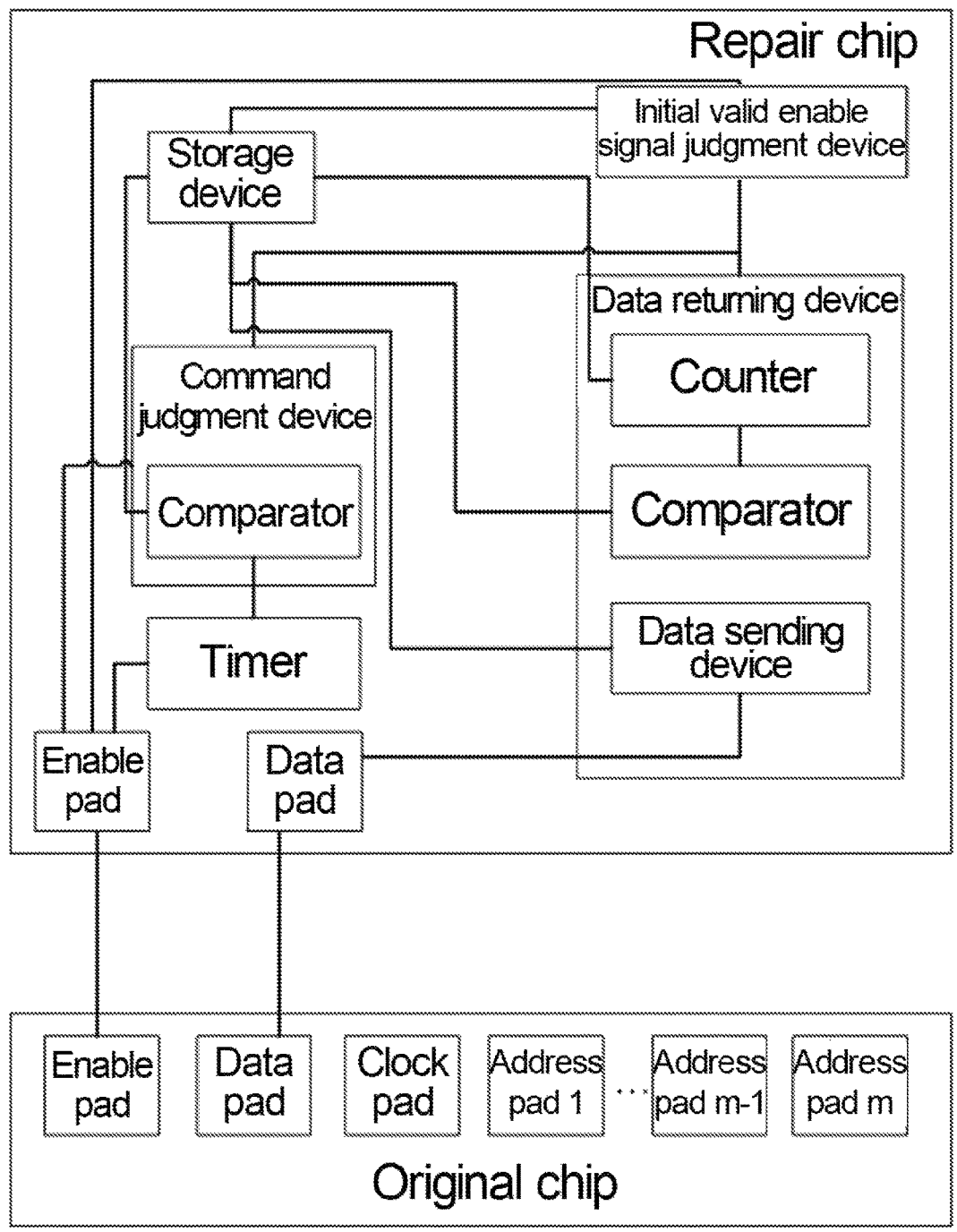
FIG. 7 is a system diagram of an ink cartridge in a second embodiment.

In the embodiment, the clock line and all the address lines can be omitted, and only the enable line and the data line are adopted. The repair chip is only provided with enable pads and data pads. As is shown in FIG. 7, the repair chip is provided with a storage device, a command judgment device, a data returning device and a timer. Repair data are stored in the storage device, and the repair data are used for making information indicating the ink cartridge residual ink quantity of an ink cartridge not be 0. The data returning device comprises a data sending device, a comparator and a counter.

A discarded ink cartridge needing to be regenerated comprises an ink cartridge body and an original chip mounted on the ink cartridge body. The repair chip is mounted on the ink cartridge body, and the enable pads of the repair chip are electrically connected with enable pads of the original chip; the data pads of the repair chip are electrically connected with data pads of the original chip.

Figure 8:
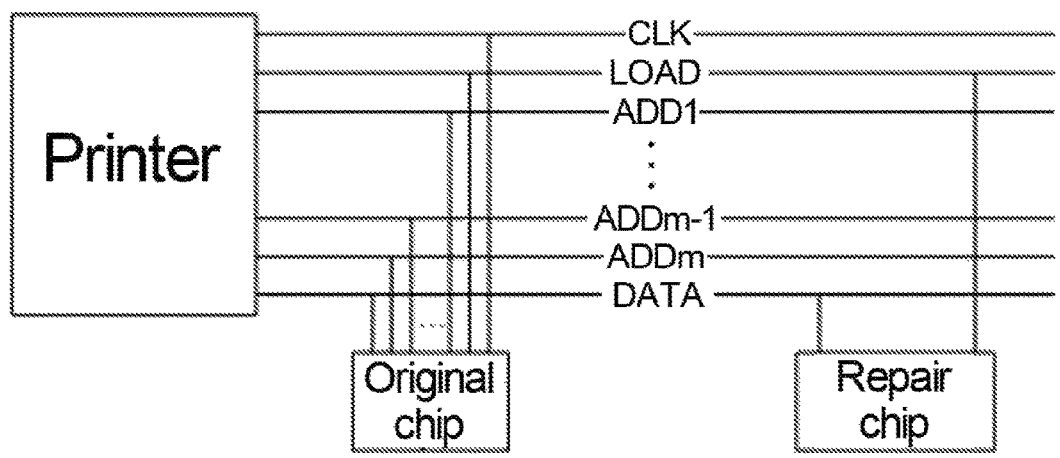
FIG. 8 is a schematic diagram of electrical connection of a repair chip, an original chip and a printer in the second embodiment.

As is shown in FIG. 8, a regenerative ink cartridge provided with the repair chip is mounted on the printer, and the enable pads of the repair chip are electrically connected with the enable line of the printer so as to monitor signals on the enable line of the printer; the data pads of the repair chip are electrically connected with the data line of the printer so as to transmit data to the printer through the data line. The timer of the repair chip is electrically connected with the enable pads so as to monitor signals on the enable line of the printer and calculate the time interval of two successive valid enable signals appearing on the enable line of the printer. The type of the command of the printer is judged according to the time interval of the two successive valid enable signals appearing on the enable line of the printer. The data returning device of the repair chip is electrically connected with the storage device and also electrically connected with the command judgment device, and all or part of the repair data are returned to the printer via the data line of the printer through the data pads of the repair chip in a preset sequence when the command judgment device judges that the command sent by the printer is a valid data reading command.

Since the chip cannot work out the time interval of the two successive valid enable signals appearing on the enable line through the timer when the enable pads monitor the first valid enable signal appearing on the enable line, the type of the command of the printer cannot be judged; under this condition, the repair chip directly returns the first repair data, which should be returned to the printer in the preset sequence, to the printer.

Therefore, the repair chip is provided with an initial valid enable signal judgment device. The initial valid enable signal judgment device is electrically connected with the enable pads so as to judge whether a valid enable signal is an initial valid enable signal or not when the enable pads monitor that the valid enable signal appears on the enable line of the printer.

The repair chip monitors the enable line of the printer through the enable pads, whether the command sent by the printer is a valid data reading command or not is judged through the command judgment device, and the data sending device of the repair chip sends all or part of the repair data to the printer in a preset sequence when the command judgment device judges that the command sent by the printer is a valid data reading command. In this way, the information, indicating the ink cartridge residual ink quantity of the ink cartridge, obtained by the printer is not 0, and the ink cartridge can continue to be used.

Figure 9:
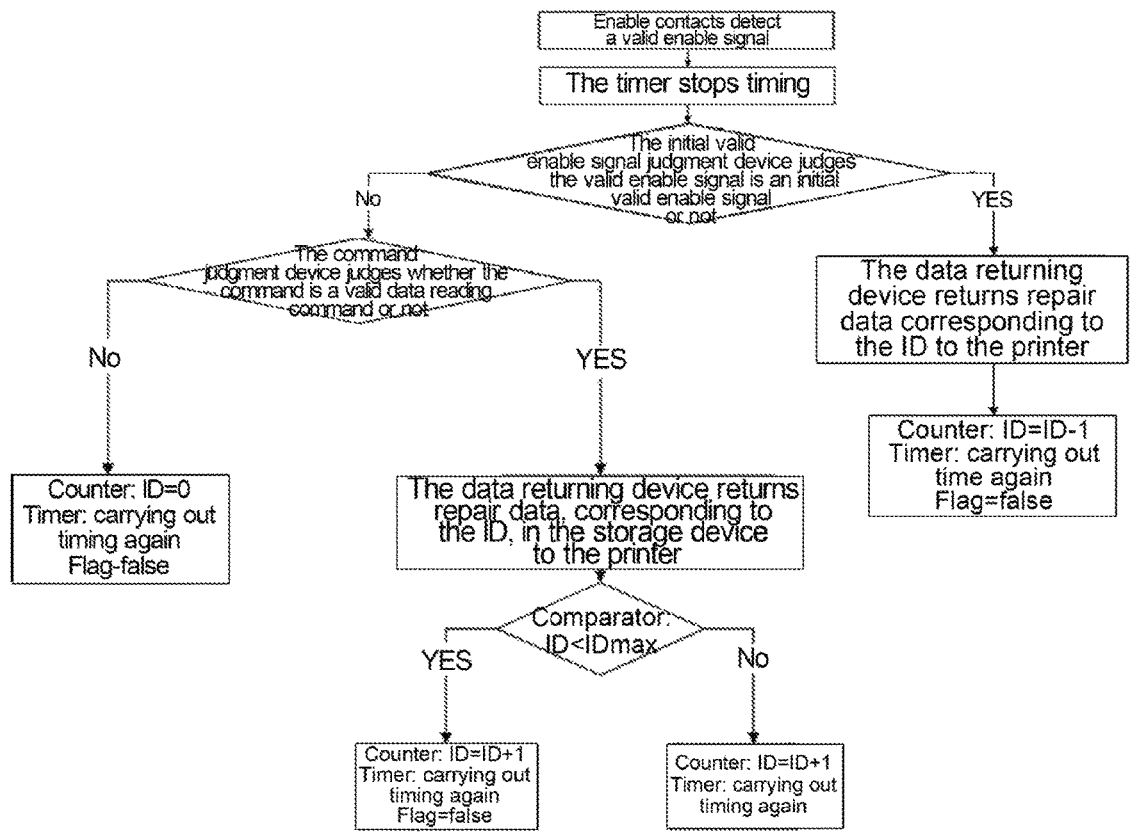
FIG. 9 is a flow diagram of the repair chip in the second embodiment.
Figure 10:
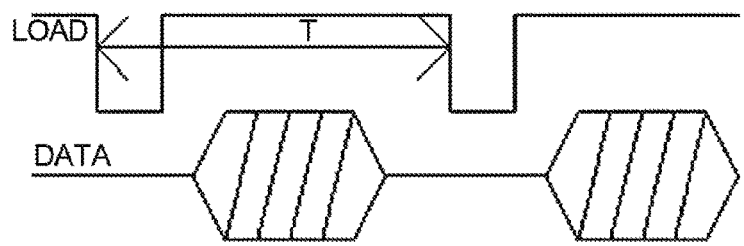
FIG. 10 is a schematic diagram of printer command judgment in the second embodiment.

FIG. 9 shows the specific working flow of the repair chip: the enable pads monitor signals on the enable line of the printer, and the timer stops timing when the enable pads detect a valid enable signal. The timing value of the timer at the moment represents the time interval T between two successive valid enable signals on the printer, as is shown in FIG. 10.

The initial valid enable signal judgment device of the repair chip is electrically connected with the enable pads, and a Flag sign (an initial enable signal sign used for marking whether the repair chip receives a valid enable signal or not; if Flag is true, it indicates that the repair chip does not receive a valid enable signal; if Flag is false, it indicates that the repair chip has already received a valid enable signal; the initial value of Flag is true) is stored in the storage device of the repair chip. The initial valid enable signal judgment device obtains the Flag sign value in the storage device when the enable pads monitor that a valid enable signal appears on the printer; if Flag is true, it is judged that the valid enable signal monitored by the enable pads is an initial valid enable signal; if Flag is false, it is judged that the valid enable signal monitored by the enable pads is not an initial valid enable signal.

The data returning device is electrically connected with the initial valid enable signal judgment device, and when the initial valid enable signal judgment device judges that the valid enable signal monitored by the enable pads is an initial valid enable signal, the data returning device returns the repair data, in the storage device, corresponding to the ID value (data index values in one-to-one correspondence with the repair data stored in the storage device; the initial value of the data index values is 0, and the data index values are used for making the repair data in a preset sequence) to the printer via the data line of the printer through the data pads. Afterwards, the repair chip sets the Flag value in the storage device to be false; 1 is added to the ID values through the counter to meet the equation of ID=ID+1; the timer carries out timing again.

The command judgment device is electrically connected with the initial valid enable signal judgment device, and the command judgment device judges whether the command sent by the printer is a valid data reading command or not when the initial valid enable signal judgment device judges that the valid enable signal monitored by the enable pads is an initial valid enable signal.

The comparator of the command judgment device is electrically connected with the timer and compares the time interval T with a preset maximum time interval value Tmax and a preset minimum time interval value Tmin; if T>Tmax or T<Tmin, the command judgment device judges that the command sent by the printer is not a valid data reading command; if Tmin<T<Tmax, the command judgment device judges that the command sent by the printer is a valid data reading command.

The data returning device is electrically connected with the command judgment device, and when the command judgment device judges that the command sent by the printer is a valid data reading command, the data returning device returns the repair data, corresponding to the ID value, in the storage device to the printer via the data line of the printer through the data pads. Afterwards, the repair chip sets the Flag value in the storage device to be false; the comparator compares the ID value with the preset IDmax value (the maximum data index value); if ID<IDmax, 1 is added to the ID value through the counter to meet the equation of ID=ID+1; if ID>=IDmax, the repair chip sets the ID value in the storage device as the initial value 0; the timer carries out timing again.

If the command judgment device judges that the command sent by the printer is not a valid data reading command, the repair chip sets the Flag value in the storage device to be false, and the ID value is set as the initial value 0; the timer carries out timing again.

Third Embodiment

Figure 11:
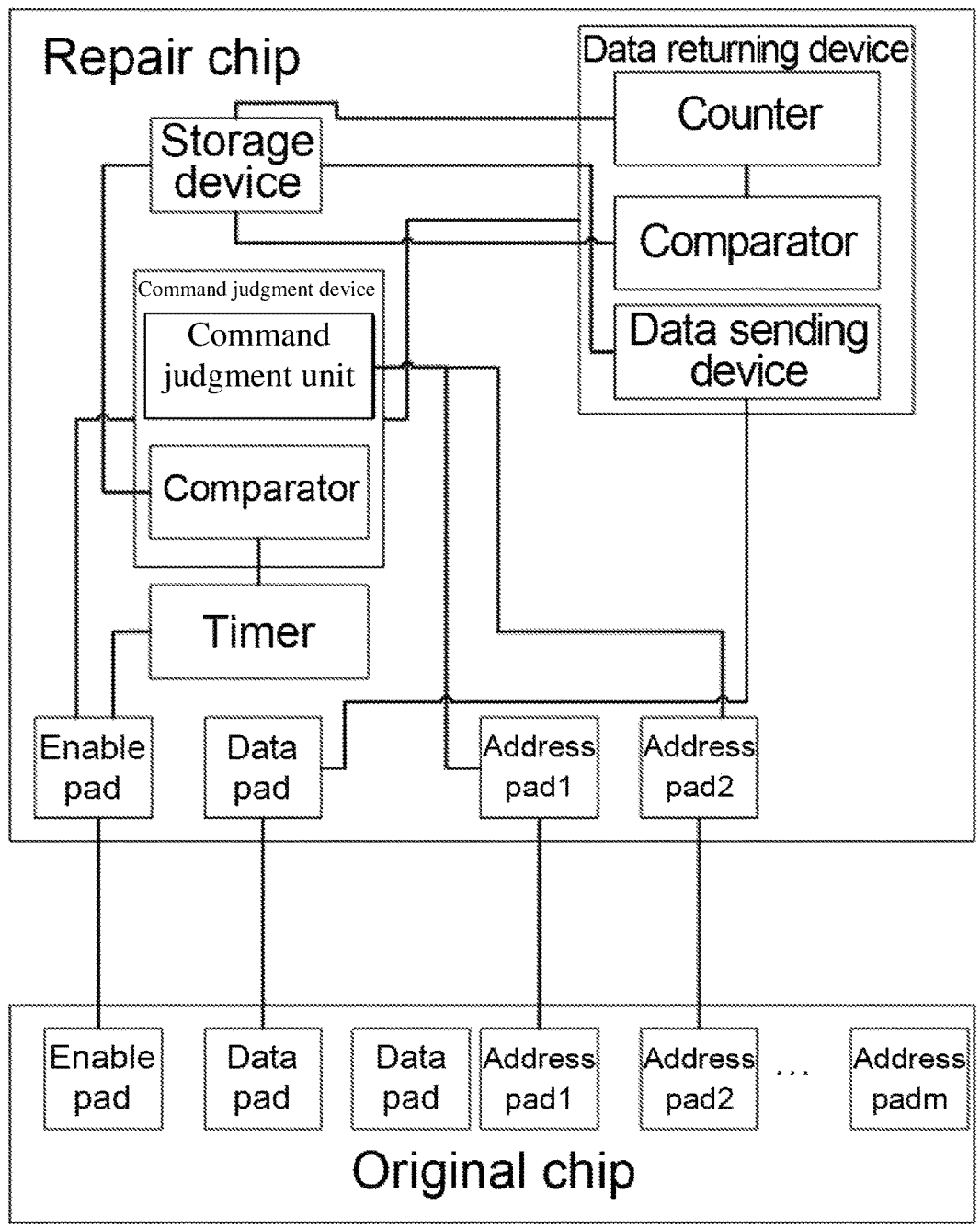
FIG. 11 is a system diagram of an ink cartridge in a third embodiment.

In the embodiment, the clock line and one or more address lines can be omitted. The repair chip is provided with enable pads, data pads and two address pads. As is shown in FIG. 11, the repair chip is provided with a storage device, a command judgment device, a data returning device and a timer. Repair data are stored in the storage device, and the repair data are used for making information indicating the ink cartridge residual ink quantity in an ink cartridge not be 0.

A discarded ink cartridge needing to be regenerated comprises an ink cartridge body and an original chip which is mounted on the ink cartridge body. The repair chip is mounted on the ink cartridge body, and the enable pads of the repair chip are electrically connected with enable pads of the original chip; the data pads of the repair chip are electrically connected with data pads of the original chip, and the two address pads of the repair chip are electrically connected with any two address pads of the original chip.

Figure 12:
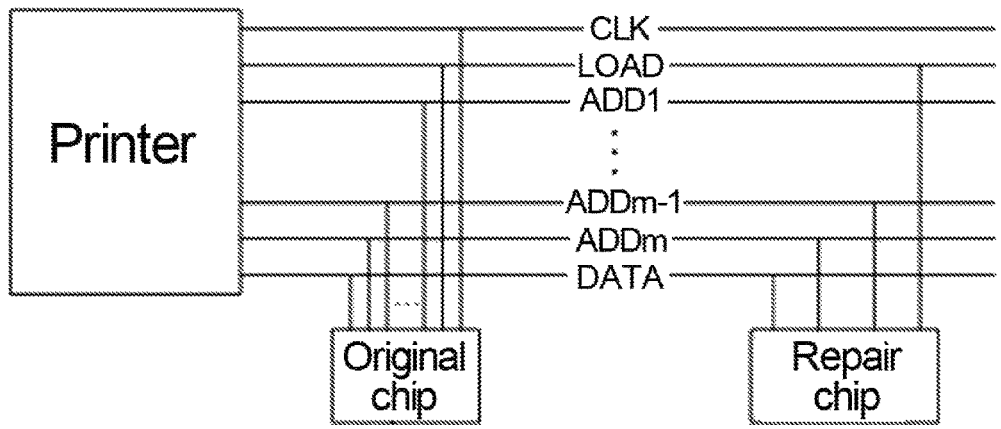
FIG. 12 is a schematic diagram of electrical connection of a repair chip, an original chip and a printer in the third embodiment.

As is shown in FIG. 12, a regenerative ink cartridge provided with the repair chip is mounted on the printer, and the enable pads of the repair chip are electrically connected with the enable line of the printer so as to monitor signals on the enable line of the printer; the data pads of the repair chip are electrically connected with the data line of the printer so as to transmit data to the printer through the data line; the two address pads of the repair chip are electrically connected with two address lines of the printer. The timer of the repair chip is electrically connected with the enable pads so as to monitor signals on the enable line of the printer and calculate the time interval of two successive valid enable signals appearing on the enable line of the printer. The command judgment device is electrically connected with the timer and also electrically connected with the two address pads of the repair chip. The command judgment device is provided with a comparator and a command judgment unit, the comparator is electrically connected with the timer, and the command judgment unit is electrically connected with the two address pads of the repair chip. For resisting interference and improving the accuracy of the judgment result, the command judgment device comprehensively judges the type of the command of the printer according to the time interval between the two successive valid enable signals appearing on the enable line of the printer and signals on the address lines. The data returning device of the repair chip is electrically connected with the storage device and also electrically connected with the command judgment device and returns all or part of the repair data to the printer via the data line of the printer through the data pads of the repair chip in a preset sequence when the command judgment device judges that the command sent by the printer is a valid data reading command.

The repair chip monitors the enable line of the printer through the enable pads, whether the command sent by the printer is a valid data reading command or not is judged through the command judgment device, and the data sending device of the repair chip sends all or part of the repair data to the printer in a preset sequence when the command judgment device judges that the command sent by the printer is a valid data reading command. In this way, the information, indicating the ink cartridge residual ink quantity of the ink cartridge, obtained by the printer is not 0, and the ink cartridge can continue to be used.

Figure 13:
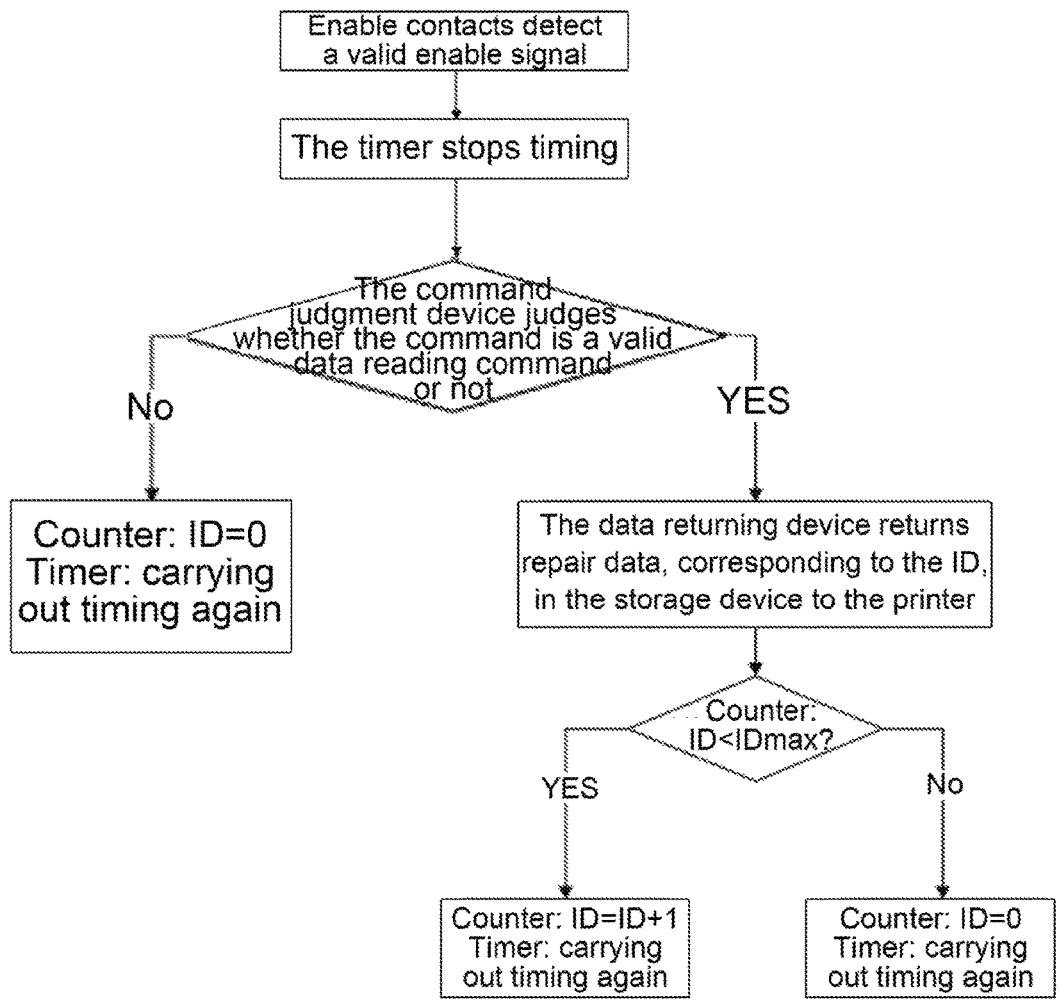
FIG. 13 is a flow diagram of the repair chip in the third embodiment.
Figure 14:
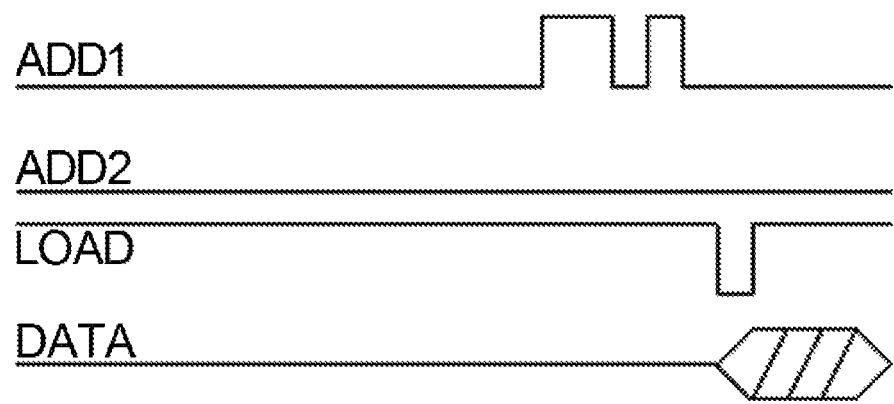
FIG. 14 is a schematic diagram of printer command judgment in the third embodiment.

FIG. 13 shows in the specific working flow of the repair chip:

the enable pads monitor signals on the enable line of the printer, and the timer stops timing when the enable pads detects a valid enable signal. The timing value of the timer at the moment represents the time interval T between the two successive valid enable signals appearing on the printer, as is shown in FIG. 14.

The command judgment device starts the command judgment unit and the comparator to comprehensively judge the type of the command of the printer when the enable pads monitor a valid enable signal;

if the command judgment unit judges that only one of all the address pads of the repair chip monitors a signal on the corresponding address line at most, the comparator compares the time interval T with a preset maximum time interval value Tmax and a preset minimum time interval value Tmin; if the comparison result is Tmin<T<Tmax, the command judgment device judges that the command sent by the printer is a valid data reading command, otherwise, the command judgment device judges the command sent by the printer is not a valid data reading command.

The data returning device is electrically connected with the command judgment device, and when the command judgment device judges that the command sent by the printer is a valid data reading command, the data returning device returns the repair data, corresponding to the ID value, in the storage device to the printer via the data line of the printer through the data pads. Afterwards, the comparator compares the ID value with the preset IDmax value (the maximum data index value); if ID<IDmax, 1 is added to the ID value through the counter to meet the equation of ID=ID+1, and if ID>=IDmax, the repair chip sets the ID value in the storage device as 0; the timer carries out timing again.

If the command judgment device judges that the command sent by the printer is not a valid enable data command, the repair chip sets the ID value in the storage device as the initial value 0; the timer carriers out timing again.

Fourth Embodiment

Figure 15:
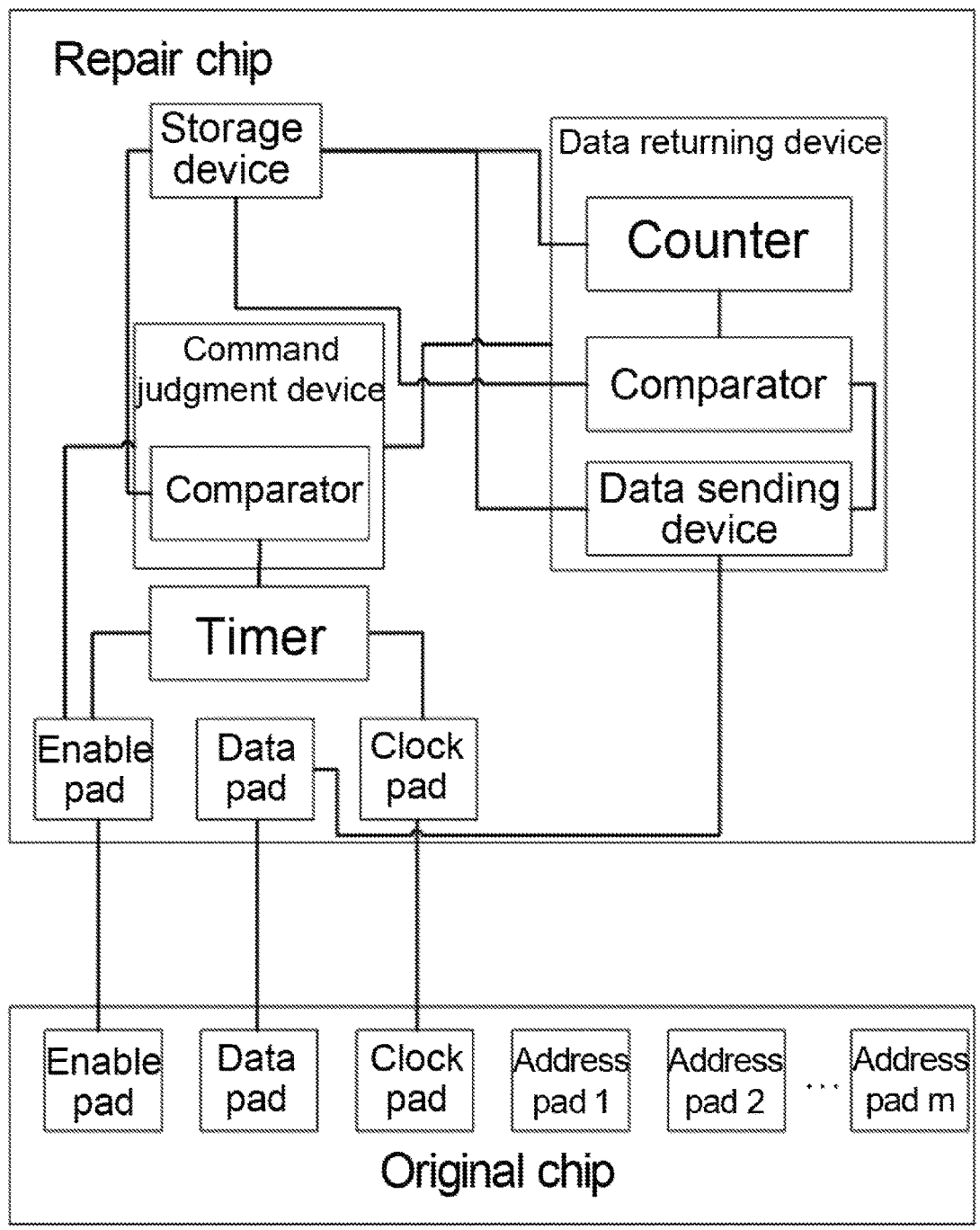
FIG. 15 is a system diagram of an ink cartridge in a fourth embodiment.

In the embodiment, all address lines can be omitted, and only the clock line, the enable line and the data line are adopted. As is shown in FIG. 15, a repair chip is only provided with clock pads, enable pads and data pads. The repair chip is provided with a storage device, a command judgment device, a data returning device and a time. Repair data are stored in the storage device, and the repair data are used for making the information indicating the ink cartridge residual ink quantity of an ink cartridge not be 0.

A discarded ink cartridge needing to be regenerated comprises an ink cartridge body and an original chip which is mounted on the ink cartridge body. The repair chip is mounted on the ink cartridge body, and the clock pads of the repair chip are electrically connected with clock pads of the original chip; the enable pads of the repair chip are electrically connected with enable pads of the original chip; the data pads of the repair chip are electrically connected with data pads of the original chip.

Figure 16:
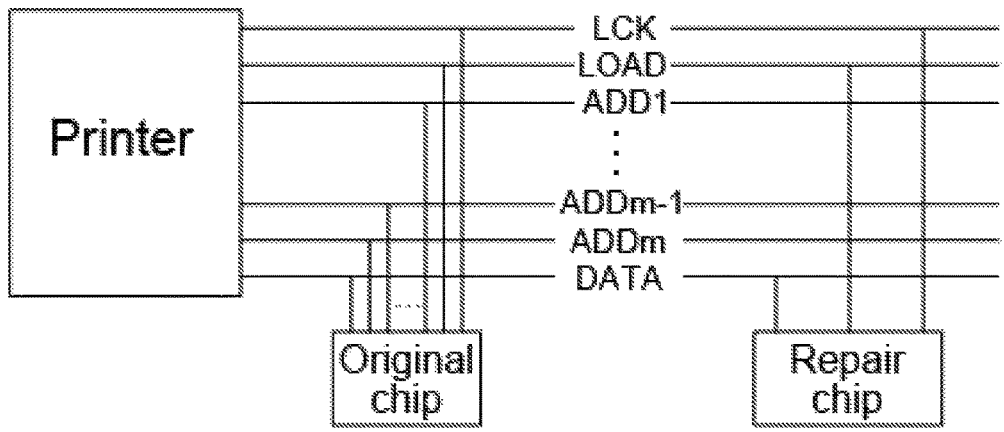
FIG. 16 is a schematic diagram of electrical connection of a repair chip, an original chip and a printer in the fourth embodiment.

As is shown in FIG. 16, a regenerative ink cartridge provided with the repair chip is mounted on the printer, and the clock pads of the repair chip are electrically connected with the clock line of the printer so as to monitor clock signals on the clock line of the printer; the enable pads of the repair chip are electrically connected with the enable line of the printer so as to monitor signals on the enable line of the printer; the data pads of the repair chip are electrically connected with the data line of the printer so as to transmit data to the printer through the data line. The timer of the repair chip is electrically connected with the enable pads and the clock pads so as to monitor a valid enable signal on the enable line of the printer and clock signals on the clock line of the printer and calculate the time interval between the valid enable signal appearing on the enable line of the printer and the last clock signal appearing on the clock line. The command judgment device is electrically connected with the timer and provided with a comparator, the comparator is electrically connected with the timer, and the type of the command of the printer is judged according to the time interval between the valid enable signal appearing on the enable line of the printer and the last clock signal appearing on the clock line of the printer. The data returning device of the repair chip is electrically connected with the storage device and also electrically connected with the command judgment device and returns all or part of the repair data to the printer in a preset sequence via the data line of the printer through the data pads of the repair chip when the command judgment device judges that the command sent by the printer is a valid data reading command.

Figure 17:
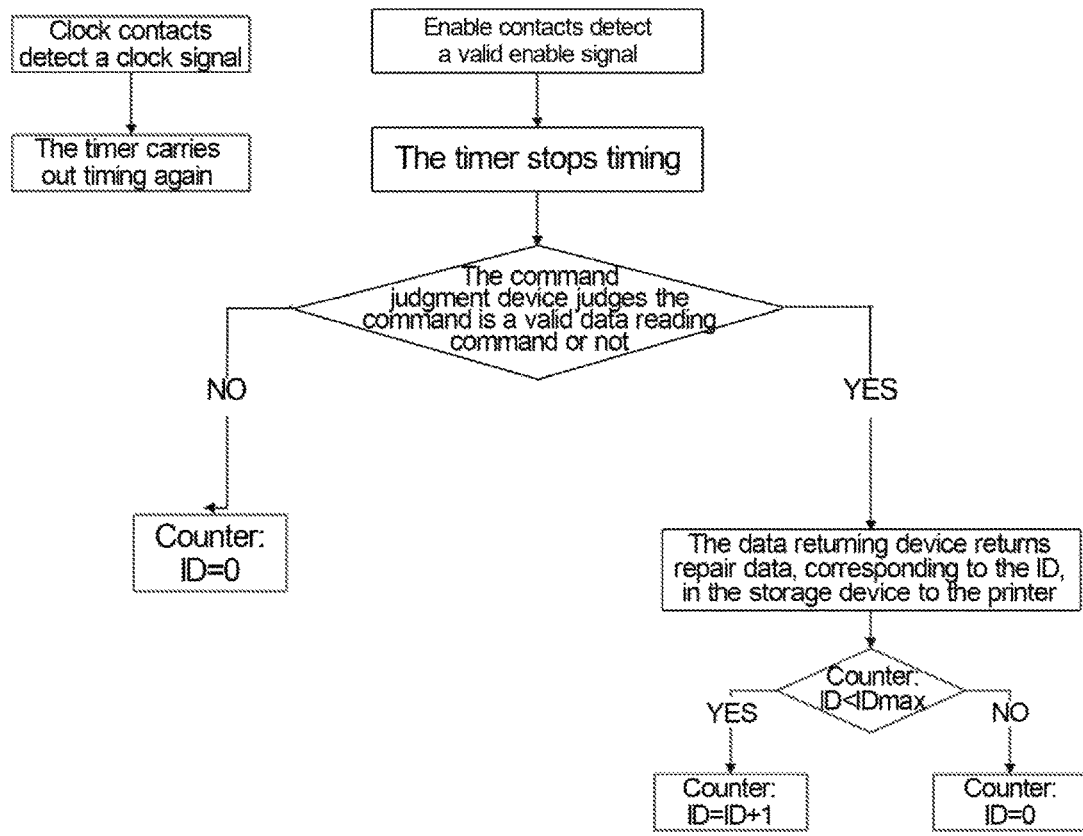
FIG. 17 is a flow diagram of the repair chip in the fourth embodiment.

FIG. 17 shows the specific working flow of the repair chip:

the clock pads monitor signals on the clock line of the printer, the repair chip clears the parameter of the timer to be zero, and the timer carriers out timing again when the clock contact detect a clock signal.

Figure 18:
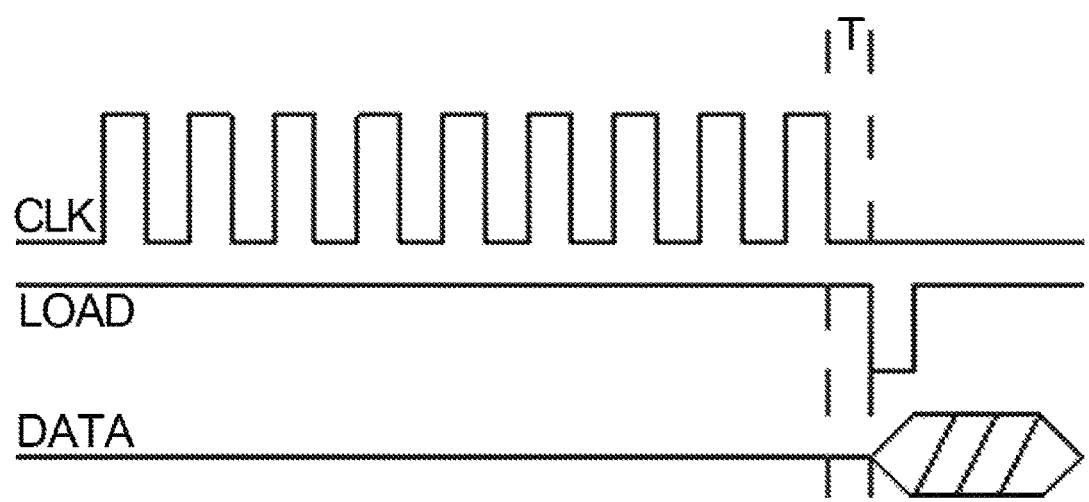
FIG. 18 is a schematic diagram of printer command judgment in the fourth embodiment.

The enable pads monitor signals on the enable line of the printer, and the timer stops timing when the enable pads detect a valid enable signal. The timing value of the timer at the moment represents the time interval T between the valid enable signal on the enable line of the printer and the last clock signal on the clock line of the printer, as is shown in FIG. 18.

The command judgment device is electrically connected with the enable pads, and when the enable pads detect a valid enable signal, the command judgment device judges whether the command sent by the printer is a valid data reading command or not;

the comparator of the command judgment device is electrically connected with the timer, and the comparator compares the time interval T with a preset maximum time interval value Tmax and a preset minimum time interval value Tmin; if T>Tmax or T<Tmin, the command judgment device judges that the command sent by the printer is not a valid data reading command; if Tmin<T<Tmax, the command judgment device judges that the command sent by the printer is a valid data reading command.

The data returning device is electrically connected with the command judgment device, and when the command judgment device judges that the command sent by the printer is a valid data reading command, the data returning device returns the repair data, corresponding to the ID value, in the storage device to the printer via the data line of the printer through the data pads. Afterwards, the comparator compares the ID value with the preset IDmax value (the maximum data index value); if ID<IDmax, 1 is added to the ID value to meet the equation of ID=ID+1, and if ID>=IMmax, the repair chip sets the ID value in the storage device as the initial value 0.

If the command judgment device judges that the command sent by the printer is not a valid data reading command, the repair chip sets the ID value in the storage device as the initial value 0.

The foregoing embodiments are only used for describing preferred execution modes of the application, but not used for limiting the concept and scope of the application. Various transformations and improvements made by those skilled in the field according to the technical scheme of the application without deviating from the concept of the application are all within the protection scope of the application, and the technical content required to be protected of the application are all recorded in the claims.

What is claimed is:

1. A repair method for a regenerative ink cartridge, suitable for a repair chip storing repair data, the repair chip is provided with enable pads, data pads and address pads; when a regenerative ink cartridge provided with the repair chip is mounted on a printer, the enable pads of the repair chip are electrically connected with the enable line of the printer so as to monitor signals on the enable line of the printer;

the data pads of the repair chip are electrically connected with the data line of the printer so as to transmit data to the printer through the data line; the address pads of the repair chip are electrically connected with the address lines of the printer so as to monitor signals on the address lines of the printer; wherein the repair chip returns all or part of the repair data to a printer through a data line of the printer according to signals on (m−1) address lines of the printer and on an enable line of the printer;

the repair data are data used for making information indicating the ink cartridge residual ink quantity of an ink cartridge not be 0;

m equals to the number of the address lines of the printer.

2. The repair method for the regenerative ink cartridge according to claim 1, wherein the repair chip judges whether a command sent by the printer is a valid data reading command or not according to signals on the (m−1) address lines and on the enable line of the printer and returns all or part of the repair data to the printer through the data line of the printer when the command sent by the printer is a valid data reading command.

3. The repair method for the regenerative ink cartridge according to claim 2, wherein when valid signals appear on the enable line of the printer, under the condition that the signals exist on at most one of the (m−1) address lines of the printer, it is judged that the command sent by the printer is a valid data reading command;

otherwise, it is judged that the command sent by the printer is not a valid data reading command.

4. The repair method for the regenerative ink cartridge according to claim 3, wherein:

the repair chip judges whether the valid enable signal appearing on the enable line of the printer is an initial valid enable signal or not according to an initial enable signal sign, and the value of the initial enable signal sign is set as a value indicating that the valid enable signal appearing on the enable line of the printer is not an initial valid enable signal after valid enabling is achieved on the enable line of the printer; the repair chip determines repair data needing to be returned to the printer according to signals on the m−1 address lines of the printer and on the enable line of the printer;

the address block where the repair data needing to be returned are located is judged according to signals on the m−1 address line of the printer when a valid enable signal appears on the enable line of the printer;

the repair data needing to be returned are found out in the address block according to data index values, and the repair data needing to be returned are returned to the printer through the data line of the printer;

the data index values are compared with the maximum data index value of the address block;

under the condition that the data index values are smaller than the maximum data index value of the address block, 1 is added to the data index values; under the condition that the data index values are greater than or equal to the maximum data index value of the address block, the data index values are set as an initial value;

wherein, the data index values are in one-to-one correspondence with the addresses, in the address block, of the repair data in the address block.

5. The repair method for the regenerative ink cartridge according to claim 4, wherein the method for judging the address block where the repair data needing to be returned are located according to signals on the (m−1) address lines of the printer when a valid enable signal appears on the enable line of the printer comprises the steps that:

according to the one-to-one corresponding relation between address blocks stored in the repair chip and the address lines of the printer, when the valid enable signal appears on the enable line of the printer, the address block where the repair data needing to be returned are located is the address block corresponding to the address line not monitored by the repair chip if no signal exists on the m−1 address lines of the printer, and the address block where the repair data needing to be returned are located is the address block corresponding to the address line with the signal if the signal exists only on one of the (m−1) address lines of the printer.

6. A repair chip for a regenerative ink cartridge, comprising a storage device used for storing repair data, characterized by further comprising:

enable pad, data pad and (m−1) address pads;

when a regenerative ink cartridge provided with the repair chip is mounted on a printer, the enable pads of the repair chip are electrically connected with the enable line of the printer so as to monitor signals on the enable line of the printer; the data pads of the repair chip are electrically connected with the data line of the printer so as to transmit data to the printer through the data line; the address pads of the repair chip are electrically connected with the address lines of the printer so as to monitor signals on the address lines of the printer;

a data returning device used for returning all or part of the repair data to the printer through data pads according to signals, monitored by address pads and the enable pads, on the (m−1) address lines of the printer;

wherein, the repair data are data making information indicating the ink cartridge residual ink quantity of the ink cartridge not be 0;

m equals to the number of the address lines of the printer.

7. The repair chip for the regenerative ink cartridge according to claim 6, wherein the repair chip comprises a command judgment device used for judging whether the command sent by the printer is a valid data reading command or not according to signals monitored by the (m−1) address pads and the enable pads, and the data returning device returns all or part of the repair data to the printer through the data pads when it is judged that the command sent by the printer is a valid data reading command according to the judgment result of the command judgment device.

8. The repair chip for the regenerative ink cartridge according to claim 7, wherein the command judgment device comprises a command judgment unit;

the command judgment unit judges that the command sent by the printer is a valid data reading command when signals are monitored on only one of the (m−1) address pads at most, otherwise, the command judgment unit judges that the command sent by the printer is not a valid data reading command.

9. The repair chip for the regenerative ink cartridge according to claim 6, wherein the data returning device comprises:

an address judgment device, wherein the address judgment device is used for judging the address block where the repair data needing to be returned are located according to signals monitored by the m−1 address pads;

a data sending device, wherein the data sending device is used for finding out the repair data, needing to be returned, in the address block according to data index values and returning the repair data needing to be returned to the printer through the data line of the printer;

a comparator, wherein the comparator is used for comparing the data index values with the maximum data index value of the address block;

a counter, wherein 1 is added to the data index values if the data index values are smaller than the maximum data index value of the address block, and the data index values are set as the initial value if the data index values are greater than or equal to the maximum data index value of the address block;

wherein, the data index values are in one-to-one correspondence with the addresses, in the address block, of the repair data in the address block;

m equals to the number of the address lines of the printer.

10. The repair chip for the regenerative ink cartridge according to claim 9, wherein the address judgment device comprises:

an address block memory used for storing the one-to-one corresponding relation between the address lines of the printer and address blocks; if the address pads do not monitor signals on any of the m−1 address lines of the printer, the address judgment device judges that the address block where the repair data needing to be returned are located is the address block, corresponding to the address line not monitored by the repair chip, in the address block memory; if the address pads monitor that the signal only exists on one of the m−1 address lines of the printer, the address judgment device judges that the address block where the repair data needing to be returned are located is the address block, corresponding to the address line with the signal, in the address block memory.

* * * * *